United States Patent [19]

Hara et al.

[11] 4,251,822
[45] Feb. 17, 1981

[54] RECORDING HEAD

[75] Inventors: Kazuyuki Hara, Yokohama; Takeshi Kamada, Atsugi, both of Japan

[73] Assignee: Ricoh Company, Ltd., Japan

[21] Appl. No.: 30,895

[22] Filed: Apr. 17, 1979

[30] Foreign Application Priority Data

May 15, 1978 [JP] Japan .................................. 53/57268

[51] Int. Cl.³ ...................... G01D 15/16; G01D 15/10
[52] U.S. Cl. ................................ 346/139 C; 346/76 R
[58] Field of Search .................. 346/139 C, 155, 76 R

[56] References Cited

U.S. PATENT DOCUMENTS 3,624,661  11/1971  Shebanow et al. ....... 346/139 C UX
4,063,255  12/1977  Bahr et al. ...................... 346/139 C

OTHER PUBLICATIONS

Foreman, D. F., Electroerosion Stylus Head, IBM Technical Disclosure Bulletin, Oct., 1974, vol. 17, No. 5, p. 1325.

Primary Examiner—George H. Miller, Jr.
Attorney, Agent, or Firm—McGlew and Tuttle

[57] ABSTRACT

A recording head for use in a recording apparatus has a plurality of sets of recording electrodes corresponding to a plurality of line densities.

12 Claims, 10 Drawing Figures

SUB-SCANNING DIRECTION

MAIN SCANNING DIRECTION

4 LINES/MM

8 LINES/MM

4 LINES/MM
A

8 LINES/MM
B

── ODD-NUMBERED SIGNAL
── EVEN-NUMBERED SIGNAL
── APPLIED VOLTAGE FOR RECORDING

RECORDING HEAD

BACKGROUND OF THE INVENTION

The present invention relates to a recording head for use in a facsimile reception apparatus capable of recording in a plurality of line density modes.

In the conventional facsimile apparatus, a recording head is provided only with a recording electrode of a size in conformity with the finest line density required and by controlling the use of the recording electrode locally, various line density modes can be set. For example, in the case where simultaneous recording of 32 lines is performed, as shown in FIG. 1, a recording head 1 provided with 32×2 electrodes $2_1$ to $2_{64}$ is set at its finest line density, for example, at 8 lines/mm. These electrodes $2_1$ to $2_{64}$ are divided into two columns, namely, the odd-numbered electrodes $2_1, 2_3, \ldots 2_{63}$ and the even-numbered electrodes $2_2, 2_4, \ldots 2_{64}$ in the sub-scanning direction with a space of 0.25 mm therebetween, and the even-numbered electrodes $2_2, 2_4, \ldots 2_{64}$ are spaced in the sub-scanning direction by 0.125 mm relative to the odd-numbered electrodes $2_1, 2_3, \ldots 2_{63}$, respectively so that the space between the odd-numbered electrodes $2_1, 2_3, \ldots 2_{63}$ are interpolated by the even-numbered electrodes $2_2, 2_4, \ldots 2_{64}$. When recording is performed with 4 lines/mm line density, all of the 64 electrodes $2_1$ to $2_{64}$ are used, as shown by the shading in FIG. 2, and the signal voltages are respectively applied thereto by 64 drive circuits. The signals to be applied simultaneously to the 64 electrodes $2_1$ to $2_{64}$ are not the same. Referring to FIG. 2, for example, and in particular to an odd-numbered electrode, such as, the electrode $2_1$, a signal is applied to that electrode after a period of time required for the relative movement of the recording head in the main scanning direction by a distance l. This is the distance between the odd-numbered electrode (for example, $2_1$) and the succeeding even-numbered electrode (for example, $2_2$) in the main scanning direction. The same thing applies to the other electrodes $2_3$ and $2_4$, $2_5$ and $2_6 \ldots$ and $2_{63}$ and $2_{64}$. In other words, with respect to a scanning line, a signal is first applied to an even-numbered electrode and the applied signal is stored in the even-numbered electrode for a period of time which is determined by the distance l and the main scanning speed, and when the preceeding odd-numbered electrode comes to a position corresponding to the original position of the above-mentioned even-numbered electrode, the same signal is applied to the odd-numbered electrode for recording. In this case, when the even-numbered electrodes $2_2, 2_4, \ldots 2_{64}$ are not used, 32 drive circuits will do for the electrodes, but in the spaces between the odd-numbered electrodes $2_1, 2_3, \ldots 2_{63}$, there occur unrecorded blank portions, which reduces the image quality.

In the case where recording is performed with 8 lines/mm line density, the electrodes $2_1$ to $2_{32}$ are employed as shown in FIG. 3, and respectively different signal voltages are applied thereto by use of 32 drive circuits.

However, in the recording head of this type, the electrodes are disposed in conformity with the finest line density mode and by controlling the electrodes locally, each line density mode is set, so that numerous electrodes are required and accordingly, numerous drive circuits are required. Therefore, such recording head becomes expensive.

SUMMARY OF THE INVENTION

It is therefore an object of the present invention to provide a recording head using less drive circuits than those of the conventional recording head.

According to the present invention, a plurality of groups of recording electrodes corresponding to a plurality of line densities are provided and each recording electrode can be selectively used as desired and a drive circuit can be commonly used for each recording electrode. Accordingly, the number of the necessary drive circuits can be reduced.

DETAILED DESCRIPTION OF THE PREFERRED EMBODIMENTS

Figure 1:
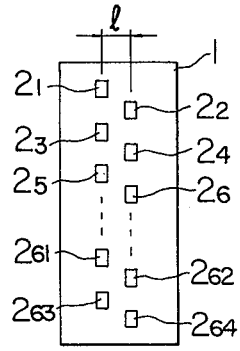
FIGS. 1, 2 and 3 are for explaining a principle of the conventional recording head.
Figure 2:
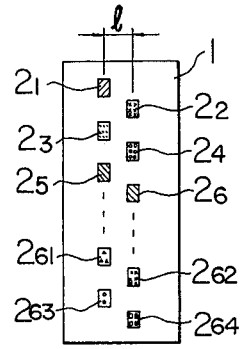
Figure 3:
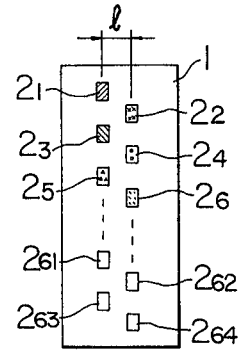
Figure 4:
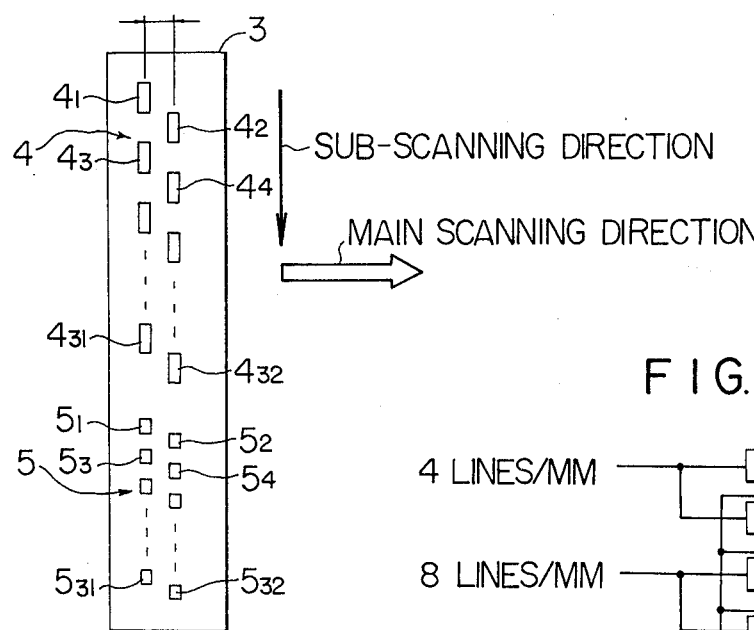
FIG. 4 is a schematic plan view of an embodiment of a recording head according to the present invention.

Referring to FIG. 4, there is shown an embodiment of a recording head according to the present invention. As shown in FIG. 4, in the facsimile reception apparatus, a recording head 3 has plural groups of recording electrodes 4 and 5 corresponding to each line density mode. The recording electrodes 4 and 5 comprise plural electrodes $4_1$–$4_{32}$, and $5_1$–$5_{32}$ arranged with predetermined spaces therebetween in the direction of sub-scanning in conformity with, for example, 4 lines/mm and 8 lines/mm, respectively. The recording electrodes 4 and 5 are changed over in accordance with a required line density rather than by an operation on the transmission side and recording is performed by a main scanning with reciprocal straight-line motion.

Figure 5:
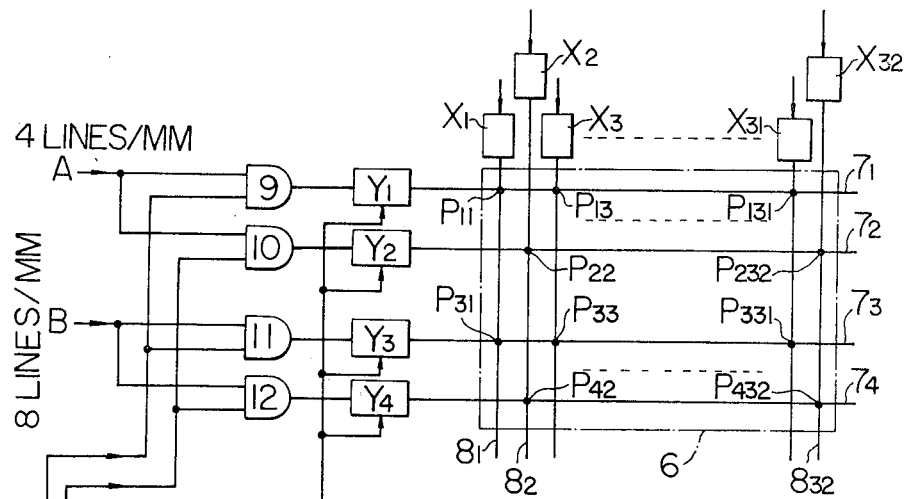
FIG. 5 is a block diagram of the peripheral circuits for use in the embodiment of FIG. 4.
Figure 6:
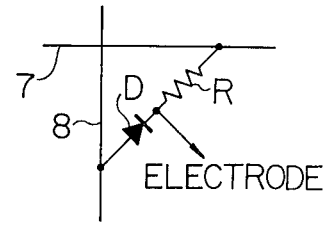
FIG. 6 is part of the block diagram of the peripheral circuits of FIG. 5.

Referring to FIG. 5, there are shown the peripheral circuits of the recording head 3. In a matrix 6 of the peripheral circuits, four row lines $7_1$–$7_4$ and 32 column lines $8_1$–$8_{32}$ are connected at their respective cross points $P_{11}$–$P_{131}$, $P_{22}$–$P_{232}$, $P_{31}$–$P_{331}$, $P_{42}$–$P_{432}$ through series circuits comprising resistors R and diodes D, one of which is shown in FIG. 6. In the cross points $P_{11}$–$P_{131}$, the connecting points of the resistor R and the diodes D are respectively connected to the odd-numbered electrodes $4_1, 4_3, \ldots 4_{31}$ for 4 lines/mm, and in the cross points $P_{22}$–$P_{232}$, the connecting points of the resistors R and the diodes D are respectively connected to the even-numbered electrodes $4_2, 4_4, \ldots 4_{32}$ for 4 lines/mm, and in the cross points $P_{31}$–$P_{331}$, the connecting points of the resistors R and the diodes D are respectively connected to the odd-numbered electrodes $5_1, 5_3, \ldots 5_{31}$ for 8 lines/mm, and furthermore in the cross points $P_{42}$–$P_{432}$, the connecting points of the resistors R and the diodes D are respectively connected to the even-numbered electrodes $5_2, 5_4, \ldots 5_{32}$ for 8 lines/mm. The change-over of the line density mode is conducted in accordance with the setting on the transmission side. In the case of 4 lines/mm line density mode, AND gates 9 and 10 are opened by a change-over signal A, and in the case of 8 lines/mm line density mode, AND gates 11 and 12 are opened by a change-over signal B. The odd-numbered signals are applied to a drive circuit $Y_1$ through the AND gate 9 or are applied to a drive circuit $Y_3$ through the AND gate 11. The even-numbered signals are applied to a drive circuit $Y_2$ through the AND gate 10 or are applied to a drive circuit $Y_4$ through the AND gate 12. The odd-numbered signals are pulse signals capable of selecting the electrodes $4_1, 4_3, \ldots 4_{31}$, $5_1, 5_3, \ldots 5_{31}$ of the odd lines of the recording head 3, the even numbered signals are pulse signals capable of selecting and the electrodes $4_2, 4_4, \ldots 4_{32}, 5_2, 5_4, \ldots 5_{32}$ of the even lines, and the drive circuits $Y_1$-$Y_4$ drive the row lines $7_1$-$7_4$ corresponding to the pulse signals generated from the AND gates 9-12. The drive circuits $X_1$-$X_{32}$ apply signal voltage corresponding to image signals to the electrodes $4_1, 4_3, \ldots 4_{31}$ when the row line $7_1$ is driven, and to the electrodes $4_2, 4_4, \ldots 4_{32}$ when the row line $7_2$ is driven, and to the electrodes $5_1, 5_3, \ldots 5_{31}$ when the row line $7_3$ is driven, and to the electrodes $5_2, 5_4, \ldots 5_{32}$ when the row line $7_4$ is driven. When recording is performed with 8 lines/mm line density, 32 electrodes are employed. Accordingly, the sheet feed distance for recording 8 lines/mm is set to one half of the sheet feed density recording by 4 lines/mm line density. In other words, the sub-scanning speed is set at $\frac{1}{2}$. Therefore, the drive circuits can be used for 8 lines/mm as well as for 4 lines/mm.

Figure 10:
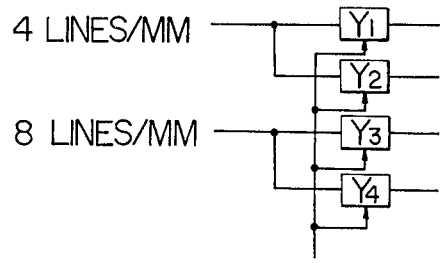
FIG. 10 is part of a block diagram of a modified peripheral circuit for use in the embodiment of FIGS. 7, 8 and 9.
Figure 7:
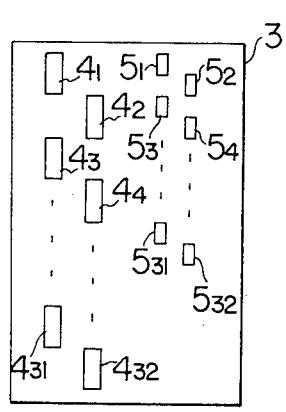
FIGS. 7, 8 and 9 are the schematic plan views of another embodiment of a recording head according to the present invention.
Figure 8:
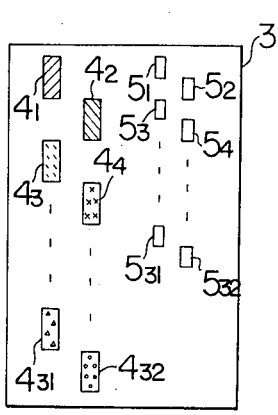
Figure 9:
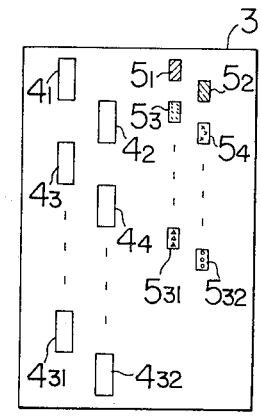

In the above-mentioned embodiment of the recording head according to the present invention, the recording electrodes 4 and 5 are arranged in the sub-scanning direction. However, they can be arranged in the main scanning direction as shown in FIGS. 7, 8 and 9. Either an electrostatic recording system or a thermosensitive recording system can be used equally well for the recording head 3. Furthermore, as shown in FIG. 10, the drive circuits $Y_1$-$Y_4$ can be operated by the change-over signals A and B of the line density mode.

What is claimed is:

1. In a facsimile apparatus of the type in which there is relative scanning motion in a main scanning direction between a recording head and a recording medium and in which there is relative movement between said head and said medium in a sub-scanning direction perpendicular to said main scanning direction, and the recording head being selectively operable in one of a plurality of line density modes, the improvement comprising: a plurality of sets recording electrodes on said head, each of said sets corresponding to one of a plurality of line density modes, each of said sets being arranged in a plurality of rows spaced apart in said sub-scanning direction, the spacing between said electrodes in each of said sets being substantially equal and being inversely proportional to the line density in the sub-scanning direction.

2. The invention as defined in claim 1 in which said sets of electrodes are spaced apart from each other in the sub-scanning direction.

3. The invention as defined in claim 1 in which said sets of electrodes are spaced apart in said main scanning direction.

4. The invention as defined in claim 1, in which the cross-sectional area of said electrodes is inversely proportional to the line density in the sub-scanning direction.

5. The invention as defined in claim 4 in which the dimension of each of said electrodes in each of said sets is proportional to the spacing between said rows in the respective set.

6. The invention as defined in claim 1, in which each of said sets is divided into a plurality of columns spaced apart in said scanning direction, the spacing between said columns for each of said sets being substantially the same.

7. The invention, as defined in claim 6, in which said electrodes in adjacent ones of said rows are in different ones of said columns.

8. The invention as defined in claim 1, in which there are the same number of said electrodes in each of said sets.

9. The invention, as defined in claim 8 comprising, in addition: circuit means to actuate said electrodes, said circuit means comprising a matrix having a number of conductors extending in one direction, said number being equal to the number of said sets, and the number of conductors intersecting said first named conductors and equal in number to the number of said electrodes in each of said sets; a driving circuit connected to each of said first named conductors to enable a selected one of said sets; and a number of signal driving circuits connected to said conductors intersecting said first named conductors to supply image signals thereto.

10. The invention, as defined in claim 9 in which each of said sets is divided into a plurality of columns spaced apart in said scanning direction, the spacing between said columns for each of said sets being substantially the same.

11. The invention as defined in claim 10 comprising gating means to enable all of said electrodes of one of said sets to be energized by said image signals.

12. The invention as defined in claim 10 comprising separate gating means to gate said electrodes in each of said columns of each of said sets; and separate enabling means to enable selected ones of said gate to transmit enabling signals to said electrodes in only one of said columns at a time.

* * * * *